United States Patent [19]

Besecke et al.

[11] Patent Number: 5,310,867
[45] Date of Patent: May 10, 1994

[54] PRODUCTION OF PARTICULATE POLY(METH)ACRYLIMIDES

[75] Inventors: Siegmund Besecke, Hameln; Andreas Deckers, Ludwigshafen; Hermann Fischer; Eckhard Neufeld, both of Limburgerhof, all of Fed. Rep. of Germany

[73] Assignee: BASF Aktiengesellschaft, Ludwigshafen, Fed. Rep. of Germany

[21] Appl. No.: 22,110

[22] Filed: Feb. 25, 1993

[30] Foreign Application Priority Data

Feb. 26, 1992 [DE] Fed. Rep. of Germany ....... 4205882

[51] Int. Cl.$^5$ ................................................ C08F 6/06
[52] U.S. Cl. ........................................ 528/502; 264/12
[58] Field of Search ........................... 528/502; 264/12

[56] References Cited

U.S. PATENT DOCUMENTS

| 4,246,374 | 1/1981 | Kopchik | 525/379 |
| 5,013,816 | 5/1991 | Bobbink et al. | 528/173 |

FOREIGN PATENT DOCUMENTS

| 234726 | 3/1991 | European Pat. Off. |
| 3644464 | 7/1988 | Fed. Rep. of Germany. |
| 2325692 | 4/1977 | France. |
| 1554278 | 10/1979 | United Kingdom. |

Primary Examiner—Joseph L. Schofer
Assistant Examiner—Tom Weber
Attorney, Agent, or Firm—Keil & Weinkauf

[57] ABSTRACT

Abstract of the Disclosure: Particles of poly(meth)acrylimides obtainable by reacting a polymer based on $C_1-C_{22}$-alkyl esters of acrylic and/or methacrylic acid with ammonia and/or at least one primary amine $RNH_2$ are produced by A) exiting a solution of the polymer from a nozzle in a multiplicity of jets of liquid,
B) breaking up the jets of liquid into droplets having a narrow size distribution by setting the nozzle swinging longitudinally or transversely or by pulsing the liquid inside the nozzle or by providing for some distance between the point of exit from the nozzle and the point of entry into a coagulating bath,
C) precipitating the resulting droplets by introducing them into a coagulating bath which contains a liquid in which the polymer does not dissolve, and
D) stripping the polymer particles of solvent residues and other impurities, and are useful for making shaped articles.

1 Claim, No Drawings

PRODUCTION OF PARTICULATE POLY(METH)ACRYLIMIDES

The present invention relates to a process for producing particulate polymers obtainable by reacting polymers based on $C_1$–$C_{22}$-alkyl esters of acrylic and/or methacrylic acid with ammonia and/or at least one primary amine $RNH_2$.

The present invention further relates to the use of these particulate polymers for manufacturing moldings, film, sheet and fiber, and to moldings, film, sheet and fiber produced from these particulate polymers.

To enhance the heat distortion resistance of acrylate molding materials, in particular polymethyl methacrylate (PMMA), they can be reacted polymer-analogously with primary amines to form cyclic imide structures. This can be done not only in the melt but also in solution.

For instance, U.S. Pat. No. 2,146,209 describes the preparation of imide-containing polymers by reacting PMMA with ammonia, urea, derivatives thereof and aliphatic amines.

To reduce the yellowness and improve the transparency of the products of U.S. Pat. No. 2,146,209, it is proposed in EP-B-234 726 to carry out the imidization in a solvent mixture comprising an aromatic hydrocarbon and an aliphatic alcohol.

U.S. Pat. No. 4,246,374 describes the preparation of thermally stable polyglutarimides by reacting PMMA melts with ammonia or primary amines in a devolatilization extruder.

The disadvantages of the poly(meth)acrylimides mentioned are their unsatisfactory values in heat distortion resistance, chemical resistance and stress cracking resistance, their limited miscibility with other polymers, their flow properties and their excessive water regain given otherwise very good values in transparency and weathering.

In the further process of these poly(meth)acrylimides it has hitherto been necessary, prior to the final shaping, to remove solvents and low molecular weight impurities and by-products from the reaction mixture in order not to impair the performance characteristics of the poly(meth)acrylimide.

Distillative removal, for example by way of evaporators or devolatilization extruders, is on the one hand very time and energy intensive and, on the other, possible only incompletely, if at all, in the case of high-boiling components. In addition, long residence times at elevated temperatures result in impaired polymer properties and in undesirable discoloration.

A further way of obtaining a pure product is to precipitate the poly(meth)acrylimides from their solutions by means of coagulants, i.e. in general solvents in which the poly(meth)acrylimides are insoluble or only sparingly soluble. The drawbacks of this method are the large coagulant requirements (in general from 5 to 10 times the amount of solvent in which the polymer is dissolved), the costly regeneration of large amounts of filtrate, and the poor handleability of the generally very finely granular and hence bulky polymers. In the case of coarsely granular precipitates the problem is frequently one of inclusions of residual solvent and byproducts.

DE-A-3 644 464 describes the isolation of aromatic polycondensates, for example of aromatic polyaryl ethers such as polysulfones, from polar, aprotic solvents by forming droplets in a coagulant such as water or a mixture of water and an alcohol under defined conditions. The particles obtained have an average diameter of from 0.2 to 2 mm and, what is more, an open-celled pore structure. They are consequently efficiently strippable of solvent residues by commonly used methods, for example by extraction. The reference does not say how this method might be used to produce particulate poly(meth)acrylimides.

It is an object of the present invention to provide a process for producing particulate poly(meth)acrylimides that is free of the abovementioned disadvantages.

We have found that this object is achieved by a process for producing particulate poly(meth)acrylimides of the type mentioned at the beginning that comprises the steps of A) exiting a solution of the polymer from a nozzle in a multiplicity of jets of liquid,
B) breaking up the jets of liquid into droplets having a narrow size distribution by setting the nozzle swinging longitudinally or transversely or by pulsing the liquid inside the nozzle or by providing for some distance between the point of exit from the nozzle and the point of entry into a coagulating bath,
C) precipitating the resulting droplets by introducing them into a coagulating bath which contains a liquid in which the polymer does not dissolve, and
D) stripping the polymer particles of solvent residues and other impurities, The present invention also provides for the use of the resultant particulate poly(meth)acrylimides for manufacturing shaped articles and shaped articles obtainable from these polymers.

For the purposes of the present invention the term "polymer based on a $C_1$–$C_{22}$-alkyl ester of acrylic or methacrylic acid" includes not only homopolymers but also copolymers, and the copolymers may additionally contain other ethylenically unsaturated comonomers.

Preferred $C_1$–$C_{22}$-alkyl methacrylates are $C_1$–$C_4$-alkyl methacrylates such as methyl methacrylate (MMA), ethyl methacrylate, propyl methacrylate, n-butyl methacrylate, isobutyl methacrylate and tert-butyl methacrylate, of which methyl methacrylate is particularly preferred, and also mixtures thereof.

Preferred $C_1$–$C_{22}$-alkyl acrylates are $C_1$–$C_4$-alkyl acrylates such as methyl acrylate (MA), ethyl acrylate, propyl acrylate, n-butyl acrylate, isobutyl acrylate and tert-butyl acrylate, of which methyl acrylate is particularly preferred, and mixtures thereof.

Suitable ethylenically unsaturated comonomers are acrylic acid, methacrylic acid, maleic acid derivatives such as imides and $C_1$–$C_{10}$alkyl esters, itaconic acid derivatives such as imides and $C_1$–$C_{10}$-alkyl esters, acrylonitrile, methacrylonitrile, styrene, α-methylstyrene, ethylene, propylene and butadiene and also mixtures thereof.

The polymers can be prepared in a single- or multistate polymerization, although in the case of a multistage polymerization at least the outermost stage must contain groups that are imidizable.

In general, the polymers contain more than 50, preferably more than 80% by weight of $C_1$–$C_{22}$-alkyl esters of methacrylic acid and acrylic acid. From experience to date it is particularly advantageous to use polymers containing from 80 to 100% by weight of methyl methacrylate and from 0 to 20% by weight of methyl acrylate and having a weight average molecular weight $M_W$ within the range from 20,000 to 300,000 g/mol.

The imidizing reagents used, besides ammonia, are primary amines, $RNH_2$. Examples are $C_1$-$C_{22}$-alkylamines such as methylamine, ethylamine, n-propylamine, isopropylamine, n-butylamine, 1-methylpropylamine, 2-methylpropylamine, 1,1-dimethylethylamine, n-pentylamine, 1-methylbutylamine, 2-methylbutylamine, 3-methylbutylamine, 2-dimethylpropylamine, 1-ethylpropylamine, n-hexylamine, n-heptylamine, n-octylamine, n-nonylamine, n-decylamine, n-undecylamine, n-dodecylamine and stearylamine, preferably methylamine, $C_5$-$C_8$-cycloalkylamines, such as cyclopentylamine, cyclohexylamine, cycloheptylamine or cyclooctylamine, preferably cyclohexylamine, wherein the cycloalkyl moieties may be monosubstituted, disubstituted or trisubstituted by radicals selected from the group consisting of $C_1$-$C_4$-alkyl, $C_1$-$C_4$-alkoxy and halogen such as fluorine, chlorine or bromine.

$C_6$-$C_{10}$-arylamines, wherein the aryl moieties may be monosubstituted, disubstituted or trisubstituted by radicals selected from the group consisting of $C_1$-$C_4$-alkyl, $C_1$-$C_4$-alkoxy and halogen such as fluorine, chlorine or bromine, such as aniline, 2-, 3- or 4-methylaniline, 2-, 3- or 4-methoxyaniline, 2-, 3- or 4-chloroaniline or 2-, 3- or 4-bromoaniline, $C_6$-$C_{10}$-aryl-$C_1$-$C_4$-alkylamines, wherein the aralkyl moieties may be monosubstituted, disubstituted or trisubstituted by radicals selected from the group consisting of $C_1$-$C_4$-alkyl, $C_1$-$C_4$-alkoxy and halogen such as fluorine, chlorine or bromine, such as benzylamine, phenethylamine or phenylpropylamine.

The imidization can be carried out for example by one of the methods mentioned in U.S. Pat. No. 2,146,209 or EP-B-234 726.

A preferred embodiment comprises heating a mixture of acrylate polymer and one or more of the abovementioned amines having a boiling point of at least 70° C., preferably at least 100° C., in a solvent or solvent mixture in the absence of oxygen. Particular preference is given to continuously distilling off the alcohol formed in the reaction, generally methanol, in order that secondary reactions such as ether formation, amine alkylation and ester saponification may be suppressed.

At the end of the reaction any excess amine may likewise be removed by distillation.

The amines employed in the reaction may be present from the start as initial charge or be added for example continuously at the rate at which they are consumed.

The reaction can be carried out continuously as well as batchwise.

The weight ratio of amine or amines used to acrylate polymer will in general be selected to be within the range from 1:1 to 400:1, preferably from 1:1 to 200:1.

The solvent used can in principle be any aprotic polar solvent such as

N,N'-disubstituted, cyclic or acyclic carboxamides such as dimethylformamide, diethylformamide, dimethyl acetamide or diethyl acetamide, N-methyl-2-pyrrolidone, N-ethyl-2-pryyolidone, N,N,N',N'-tetrasubstituted, cyclic or acrylic ureas such as tetramethylurea, N-substituted, cyclic or acyclic (poly)amines such as dicyclohexylmethylamine, dimethylcyclohexylamine, N,N,N',N'-tetramethylethylenediamine or N,N,N',N'-tetramethylhexamethylenediamine, high boiling ethers such as ethylene glycol dimethyl ether or diethylene glycol dimethyl ether, alkylene carbonates such as ethylene carbonate or propylene carbonate, and any other customary aprotic and polar solvent such as hexamethylphosphoramide, nitroalkanes such as nitromethane, dimethyl sulfoxide, diphenyl sulfoxide or sulfolane, and mixtures thereof, Preference is given to using N-methylpyrrolidone, dimethylformamide, dimethyl sulfoxide and sulfolate, particular preference being given to N-methylpyrrolidone.

The weight ratio of solvent or solvent mixture used to polymer is in general within the range from 1:1 to 100:1, preferably from 1:1 to 10:1.

The reaction can be carried out not only with but also without solvent, the option without solvent being advantageous in the case of imidization in an extruder. If the poly(meth)acrylimides are prepared without solvent, it is convenient to prepare solutions in the abovementioned solvents after the reaction.

The reaction temperature is in general within the range from 100° to 350° C., preferably within the range from 120° to 270° C.

The reaction pressure is in general not critical. In fact, the reaction is in general carried out in solution within the range from 80 to 250 kPa, preferably under atmospheric pressure.

The choice of pH is likewise not critical and in general is above pH 7 on account of the amines used.

The reaction time is in general within the range from 0.01 to 100 h, preferably from 0.05 to 20 h.

Furthermore, catalysts may be added to the reaction mixture within the range from 0.01 to 10% by weight, based on the polymer used. Examples are tertiary amines such as tricyclohexylamine, substituted guanidines such as 1,1,3,3-tetramethylguanidine or 1,3-diphenylguanidine, tetrasubstituted alkylammonium compounds such as trimethylstearylammonium chloride, organic titanium compounds such as tetrapropoxytitanium or tetrabutoxytitanium, organic tin compounds such as dibutyltin oxide or dibutyltin didodecanoate, aromatic amines such as quinoline, isoquinoline, 4-benzylpyridine, 4-phenylpyridine, 2-hydroxypyridine, 1,3-, 1,4- or 2,3-benzodiazine, or 2,2'-, 2,3'- or 2,4'-bipyridyl, imides such as N,N'-dicyclohexylcarbodiimide, and also antimony trioxide, tin dioxide, sodium amide, sodium and potassium alcoholates such as sodium methoxide or potassium methoxide, ammonium chloride and ammonium iodide.

The polymer thus formed is in general soluble in the abovementioned solvents, although it can be of advantage for some of the polymer to be present as a solid. The reaction solutions can be used directly in the process of the invention. It will be readily understood that solutions with poly(meth)acrylimides prepared in some other way can also be used.

Preference is given to using solutions which in general have a viscosity of from 500 to 50,000, preferably from 1000 to 10,000, mPa.s (measured on a pure solution at room temperature).

The solids contents of these solutions can in general be chosen within the range from 0 to 60% by weight, preferably from 25 to 55% by weight.

For the subsequent steps of the process of the invention the temperature of the poly(meth)acrylimide solution will in general be chosen to be within the range from 15° to 250° C., preferably from 40° to 180° C., particularly preferably from 80° to 120° C.

In step A) of the process of the invention the polymer solution is divided by means of a nozzle into a multiplicity of jets of liquid. Care must be taken here to ensure that the throughput is not so high that atomization takes place immediately on exit from the nozzle, since this would produce a very nonuniform droplet spectrum.

The nozzles used are preferably capillaries having a diameter of from 0.1 to 2.0 mm, in particular of from 0.3 to 1.0 mm, and a throughput of from 10 to 3000 g/h, in particular of from 400 to 2000 g/h, per capillary. It will be readily apparent that a plurality of capillaries can be connected in parallel. The pressure upstream of the capillary is in general within the range from 100 to 10,000 kPa, in particular from 1000 to 5000 kPa.

The pressure can be produced using customary methods and apparatus such as piston, membrane or gear pumps.

When the jets of liquid have been produced, they are broken up to form uniform, i.e. uniformly sized, droplets. This can be accomplished for example by simply providing a sufficient distance between the point of exit from the nozzle and the point of entry into the coagulating bath. This is because, although a jet of liquid will initially emerge from a capillary as a smooth column, it will after a certain distance begin to form waves which cause the jet to break up into droplets of equal size.

Other ways of achieving controlled jet breakup in practice are setting the nozzle swinging or pulsing the liquid inside a stationary nozzle.

The capillary can be set swinging longitudinally or transversely. To set it swinging longitudinally the nozzle can be attached for example to a membrane which is set swinging longitudinally with the aid of a tone generator connected via a transducer for converting acoustic into mechanical energy. Instead of the tone generator system it is also possible to use a piezoelectric transducer.

Transversal swinging is in general produced using vibrators.

Another way of achieving jet breakup is to pulse the liquid inside a stationary capillary, for example by means of an oscillator. In this case the liquid that is to be broken up into droplets passes though a vibration chamber driven by the oscillator and breaks up on exit from the capillary.

The swinging or vibrating freqeuncy is in general within the range from 5 to 5000 $s^{-1}$.

By applying such periodic disturbances it is possible to shorten the distance between the point of exit from the nozzle and the point of entry into the coagulating bath without impairing the uniformity of drop size.

It follows from the above that the distance between the point of exit from the nozzle and the point of entry into the coagulating bath can be varied within wide limits, depending on the version of the process. In general it is advantageous for the distance to be within the range from 0.1 to 2 m, in particular from 0.2 to 1.5 m, the lower values applying for the abovementioned reasons to jet breakup by periodic disturbance.

In step C), the droplets produced in step B) are introduced into a coagulating bath, which contains a liquid in which the polymer does not dissolve. Since the nozzle is in general situated above the coagulating bath, the droplets formed from the jets pass into the coagulating bath under the influence of the force of gravity, so that no special apparatus is required here.

Suitable nonsolvents (coagulants) are for example water and alcohols ROH of from 1 to 8 carbon atoms, such as methanol, ethanol, pentanol, etc., and also mixtures of water and such alcohols, preference being given to water containing from 0 to 50% by weight of methanol.

The temperature of the coagulating bath is not critical per se and is in general between room temperature and a temperature close to the boiling point of the coagulating medium. To avoid losses through evaporation, the entire apparatus (nozzle and coagulating bath) can be designed as an enclosed system and be kept under a protective gas or under a small superatmospheric pressure. However, it is also possible, and frequently advantageous, to employ atmospheric pressure.

In the final step D), the solvent residues and other impurities still present in the polymer particles formed in the precipitating step are removed after the polymer particles have been removed from the coagulating medium.

This can be accomplished using processes for purifying particulate solids that are known per se and described in the literature. Examples are washing and subsequent drying (if no sparingly volatile impurities are present any longer, purification may in certain circumstances be effected directly by evaporating the solvent) and known methods of extraction.

It is particularly advantageous to carry out the removal of the solvent and any impurities by solid-liquid extraction. Suitable extractants are for example water, alcohols of from 1 to 8 carbon atoms, in particular methanol or ethanol, acetone and mixtures thereof.

The extraction conditions do of course depend on the choice of extractant, but can otherwise be varied within wide limits. For instance, the extraction can be carried out under superatmospheric pressure or under reduced pressure and optionally under a protective gas atmosphere. In general, it is carried out under atmospheric pressure.

Suitable protective or inert gases are nitrogen and noble gases, in particular argon.

The extraction temperature depends on the choice of extractant and is preferably just below the boiling point thereof.

After the extractant has been removed, the particulate polymers can be conventionally finished and prepared for further use.

The process of the invention gives particulate polymers having a very narrow size distribution, i.e. very uniform particles, which is advantageous for the rest of the finishing operations.

The interval ±10% either side of the average particle size will in general include at least 70% of all particles, in particular at least 75%.

The poly(meth)acrylimide of the invention can be processed in a conventional manner, for example by injection molding, extrusion molding or sintering to make shaped articles.

In contradistinction to prior art processes, the method of the invention does not produce any bulky, solvent-containing polymers. Furthermore, compared with the distillative workup of poly(meth)acrylimides, the process requires distinctly less solvent.

EXAMPLES

Example 1

In a reaction vessel equipped with a packed column, a mixture of 200 g of PMMA (comprising 99% by weight of MMA and 1% by weight of MA and having an average molecular weight of from 115,000 g/mol), 150 g of cyclohexylamine and 650 g of N-methylpyrrolidone was heated to the boil under nitrogen. After about 1 h methanol became removable at the top of the column, and the next 6 h were run in such a way that the temperature at the top of the column was not higher than 70° C. This produced 70 g of distillate. Then the excess amine was distilled off and the polymethacrylimide was precipitated in methanol and subsequently dried.

Examples 2 and 3

Example 1 was repeated using instead 350 g of N-methylpyrrolidone in Example 2 and 250 g in Example 3. This resulted in different solids contents (see table).

The resulting PMI solutions (solids content and degree of imidization see table) were passed with the aid of a gear pump through a capillary nozzle plate having a capillary diameter of 0.8 mm to form jets of liquid. The throughput per capillary was 1600 g/h. The distance from the point of exit from the capillary to the coagulating bath, containing water at 80° C. as coagulant, was 0.7 m.

The particles produced according to the invention were separated off, then extracted with water and subsequently dried. 75% of all the particles had a diameter within 10% of the average (see table). The particles had an open-celled pore structure.

TABLE

| | Solvent | Solids [%] | Temp. [°C.] | Pressure (bar) | Polymer particles Spherical shape |
|---|---|---|---|---|---|
| 1 | NMP[1) | 25 | 27 | 15 | solid spheres ⌀ 1.5 mm |
| 2 | NMP | 37 | 85 | 20 | solid spheres ⌀ 1.6 mm |
| 3 | NMP | 44 | 120 | 30 | solid spheres ⌀ 1.6 mm |

[1)]NMP = N-methylpyrrolidone

We claim:
1. A process for producing a particulate form of a poly(meth)acrylimide which comprises
   A) exiting a solution of the poly(meth)acrylimide having a solids content from 25 to 55% by weight from a nozzle in a multiplicity of jets of liquid,
   B) breaking up the jets of liquid into droplets having a narrow size distribution by setting the nozzle swinging longitudinally or transversely or by pulsing the liquid inside the nozzle or by providing for some distance between the point of exit from the nozzle and the point of entry into a coagulating bath,
   C) precipitating the resulting droplets by introducing them into a coagulating bath which contains a liquid in which the poly(meth)acrylimide does not dissolve, and
   stripping the poly(meth)acrylimide particles of solvent residues and other impurities.

* * * * *